United States Patent [19]

Taguchi et al.

[11] Patent Number: 5,583,599
[45] Date of Patent: Dec. 10, 1996

[54] PHOTOGRAPHIC FORMAT INDICATOR FOR A CAMERA

[75] Inventors: Ichiro Taguchi; Yuichi Kurosawa, both of Tokyo, Japan

[73] Assignee: Asahi Kogaku Kogyo Kabushiki Kaisha, Tokyo, Japan

[21] Appl. No.: 312,909

[22] Filed: Sep. 29, 1994

[30] Foreign Application Priority Data

Sep. 30, 1993 [JP] Japan .................................. 5-268340

[51] Int. Cl.⁶ .......................... G03B 17/00; G03B 17/24
[52] U.S. Cl. .......................... 396/284; 396/310; 396/436
[58] Field of Search .................................. 354/105, 106, 354/159, 94, 289.12, 474, 475

[56] References Cited

U.S. PATENT DOCUMENTS

| | | | |
|---|---|---|---|
| 4,678,299 | 7/1987 | Harvey | 354/21 |
| 4,678,300 | 7/1987 | Beach | 354/21 |
| 4,692,008 | 9/1987 | Arakawa et al. | 354/217 |
| 4,990,944 | 2/1991 | Yamamoto et al. | 354/173.1 |
| 5,086,311 | 2/1992 | Naka et al. | 354/195.1 |
| 5,335,031 | 8/1994 | Ogawa. | |
| 5,347,335 | 9/1994 | Misawa | 354/288 |
| 5,353,077 | 10/1994 | Tanaka et al. | 354/94 |
| 5,376,982 | 12/1994 | Takahashi | 354/159 |
| 5,426,477 | 6/1995 | Kume et al. | 354/106 |

Primary Examiner—Michael L. Gellner
Assistant Examiner—Daniel Chapik
Attorney, Agent, or Firm—Greenblum & Bernstein, P.L.C.

[57] ABSTRACT

A photographic format indication system for a camera having at least two selectable photographic formats. The indication system identifies the photographic format of previously exposed frames of film in the camera following an exposure of a frame. The indicated format is maintained after a photographic format is no longer selected. The indicator may be an electronic display or a symbol printed on a firm cartridge.

18 Claims, 10 Drawing Sheets

PHOTOGRAPHIC FORMAT INDICATOR FOR A CAMERA

BACKGROUND OF THE INVENTION

The present invention relates to an indicator for a camera that indicates a selected photographic format of multiple possible photographic formats.

Conventionally, a camera having more than one photographic format is provided with shield plates arranged near the film plane to shade a part of the exposure area. For example, a multi-format camera, having a "panoramic" format in addition to a normal format, may use shield plates to provide a narrow "panoramic" exposure area. The shield plates are moved in and out of the optical path depending on the choice of format.

However, a roll of film exposed by a multi-format camera may include frames all exposed in the panoramic format, all in normal format, or in a mixture of both. When a user brings an exposed roll of film to a processing laboratory, the laboratory should be informed of the format of the exposed film. A typical multi-format camera has no means of indicating the format of the frames of the exposed film. When a roll of film rests in the camera for a long time, or when the camera (and the same roll of film) is used by different users, it is difficult to determine the format of the exposed film.

SUMMARY OF THE INVENTION

It is therefore an object of the present invention to provide an improved photographic format indication system for a camera that indicates to a user the photographic format of the various frames of exposed film in the camera.

For the above object, according to one aspect of the present invention, an improved photographic format information indication system (for a camera able to select one of a plurality of selectable photographic formats) is provided. The system includes a detector that detects a selected photographic format of each frame of a film when the camera has performed an exposure on the frame, a means for indicating information, and a controller for controlling the indicating mechanism to indicate information representative of at least one instance of the detection of at least one predetermined photographic format. Preferably, the controller controls the indication mechanism so that the indicated information remains indicated until the film is removed from the camera.

According to another aspect of the present invention, a photographic format information indication system includes a detector that detects a selected photographic format of each frame of a film when the camera has performed an exposure on the frame. Further, an indicating device comprising a printing mechanism is provided. The printing means printing information on a film cartridge loaded in the camera, and a controller is provided for controlling the printing mechanism to print information representative of at least one instance of a detection of at least one predetermined photographic format by the detector. Preferably, the controller controls the printing mechanism to print the photographic format information on a film cartridge loaded in the camera when the film cartridge is to be removed from the camera.

According to another aspect of the present invention, the above-mentioned controller is provided with a counter for counting a number of the frames exposed in each of the photographic formats. The controller updates the counter after each of the frames is exposed by the camera. For the indicating device the controller controls the indicating device to update the information, based on the counting performed by the counter, after each of the frames of the film is exposed, and the indicated or printed information represents the number of the frames exposed in at least one of the photographic formats. Optionally, the indicating device has portions for selectively indicating character information showing that the film contains only frames exposed in the first photographic format, that the film contains only frames exposed in the second photographic format, and that the film contains frames exposed in both of the first and second photographic formats. In this case, the controller selects the character information according to the counter. Alternatively, the indicating device or the printing is provided with portions for indicating the number of exposed frames of the film in each of the photographic formats.

According to yet another aspect of the present invention, a photographic format information indication system comprises a photographic format selection switch, an indication device, and a controller. In this case, the controller controls the indication device, in response to a status of the photographic format selection switch, to indicate information representative of at least one instance of at least one predetermined photographic format selection. The controlling is performed following an exposure on a frame of the film. The controller controls the indication device so that the indicated information remains indicated until the film is removed from the camera.

According to still yet another aspect of the present invention, a photographic format information indicating process for a camera comprises the steps of detecting a selected photographic format of each frame of a film when the camera has performed an exposure on the frame, recording at least one instance of the detection of at least one predetermined photographic format, and indicating information representative of the recording. Preferably, the indication continues until removal of the film from the camera. Optionally, the indicating step comprises a printing step to print information on a film cartridge loaded in the camera.

DESCRIPTION OF THE ACCOMPANYING DRAWINGS

DESCRIPTION OF THE EMBODIMENTS

An embodiment of the present invention is described hereinafter with reference to the drawings.

Figure 1:
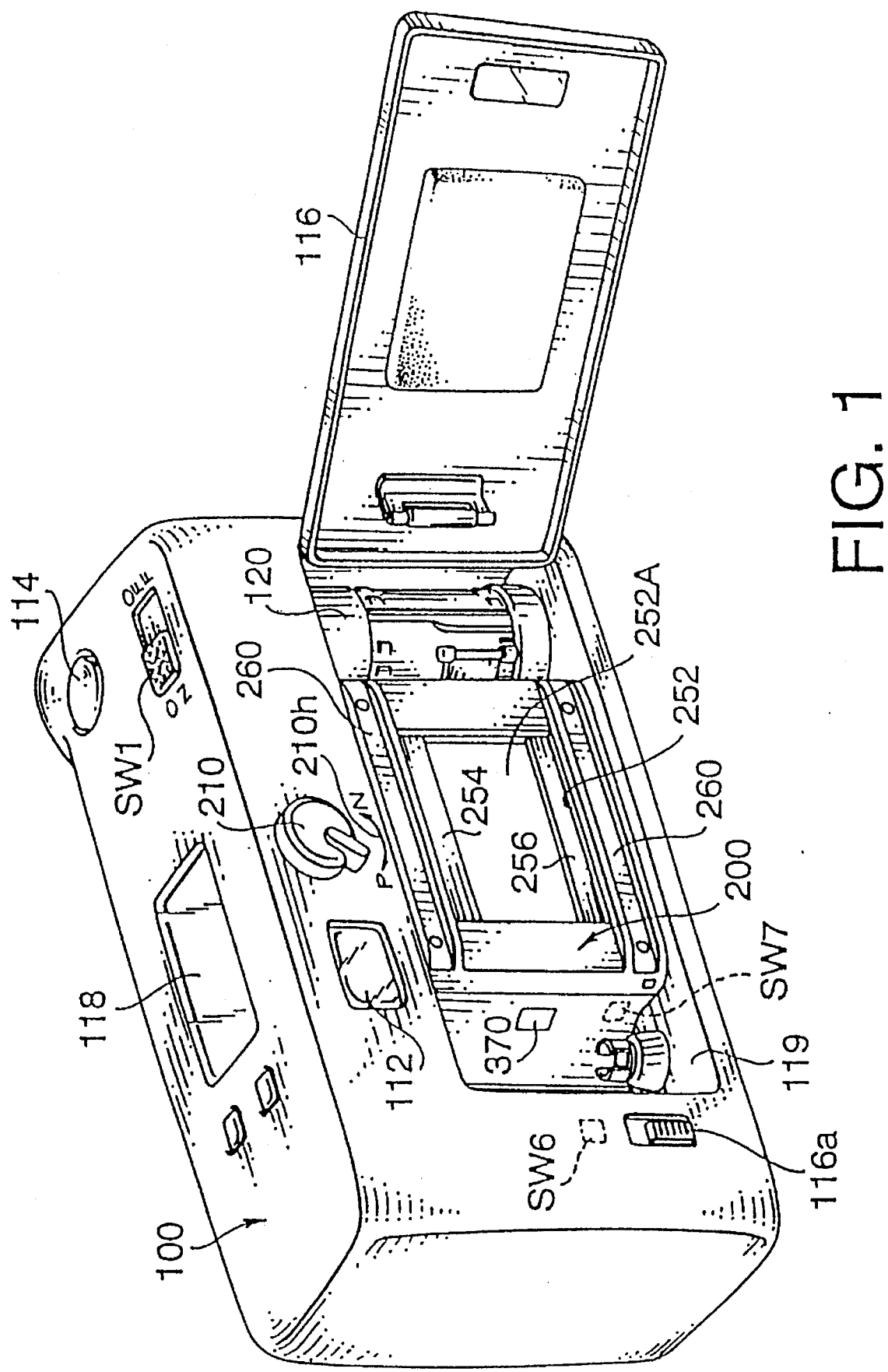
FIG. 1 is a perspective view of a camera having an indicating system according to the embodiments of the present invention.

FIG. 1 shows a camera 100 having a format changing mechanism 200 and an indicator embodying the present invention. In the following embodiments, photographic formats which can be selected by the camera include a "panoramic" format and a normal format.

A viewfinder 112 is provided in the back panel of the camera 100 and is provided with a viewing field changer (not shown) which changes a viewing field to match the state of the photographic format changing mechanism 200. A main switch SW1, a shutter button 114 and an LCD (liquid crystal display) panel 118 are mounted on the top panel of the camera 100. The main switch SW1 turns the power of the camera 100 ON and OFF, and is actuated by a sliding motion. The shutter button 114 responds at two levels of actuation as it is pushed down. When the shutter button 114 is depressed by approximately one-half of its full range, a photometry switch SW2 turns ON. The photometry switch SW2 actuates a light metering operation and an autofocus ranging operation in the camera. When the shutter button 114 is further depressed to its full limit, a release switch SW3 turns ON. The release switch SW3 actuates the shutter release of the camera.

A back cover 116, which may be opened and closed, is attached on the back of the camera 100 and is opened by actuating an opener lever 116a. A back cover condition detecting switch SW6 is provided in the body of the camera 100 to detect whether the back cover 116 is open or closed.

In the rear of the camera body, a centrally mounted aperture frame 252 defines a photographing aperture 252A. A film chamber 119 and is turned spool 120 are positioned on either side of the aperture frame 252 in the body. The aperture frame 252, the film chamber 119, and the spool 119 are covered by the back cover 116 when the back cover is closed. A film detecting switch SW7, mounted in the film chamber 119, turns ON when a film cartridge is present in the chamber 119, and OFF when the film chamber 119 is empty. Guide rails 260, 260 are attached above and below the photographing aperture 252A to guide the film from the film chamber 119 to the spool 120.

Figure 2:
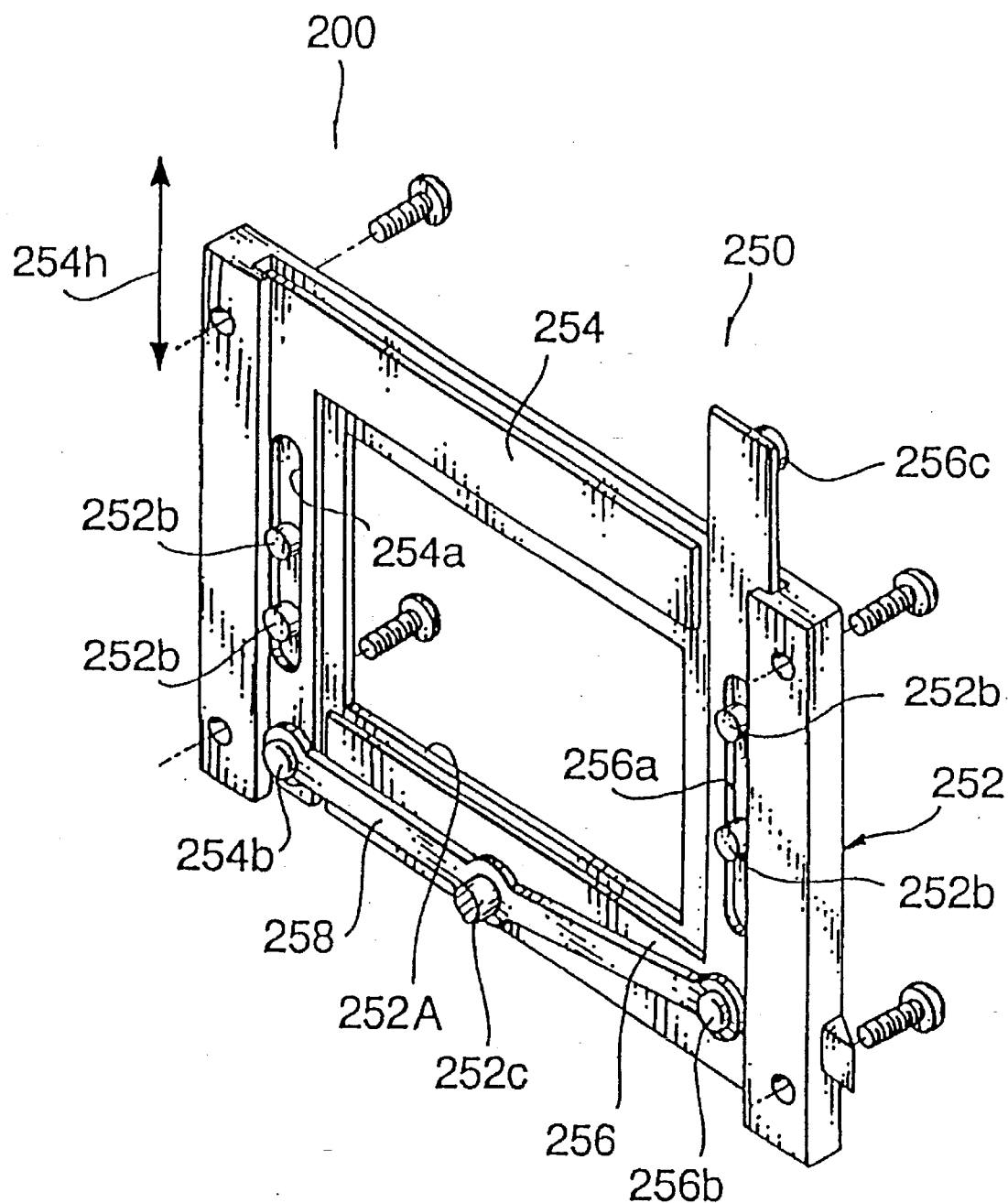
FIG. 2 is a perspective view of a construction of an aperture frame and shield plates according to the embodiments of the present invention.

FIG. 2 shows the format changing mechanism 200, from a viewpoint on the main lens side of the camera. The changing mechanism 200 is mounted between the main lens and the film plane of the camera. The upper shield plate 254 and the lower shield plate 256 are both slidably mounted in the aperture frame 252. The upper shield plate 254 is "L" shaped, and comprises a vertical guide slit 254a on the vertical arm of the upper shield plate 254. Guide pins 252b of the aperture frame 252 engage the guide slit 254a of the upper shield plate 254, and guide the upper shield plate 254 to move up and down. The guide pins 252b, also act as stops to limit the range of movement of the upper shield plate 254 in the vertical direction.

The lower shield plate 256 is similarly L-shaped, and comprises a vertical guide slit 256a on the vertical arm of the lower shield plate 256. Guide pins 252b of the aperture frame 252 engage the guide slit 256a of the lower shield plate 256 and guide the lower shield plate 256 to move up and down. The lower shield plate 256 further comprises a coupling pin 256c formed on the upper part of the vertical arm. The coupling pin 256c is used to move the shield plates 254, 256, and is connected with a format changing lever 210, shown in FIG. 3.

As seen in FIG. 2, the shield plates 254, 256 are linked to opposite ends of a linking lever 258. The linking lever 258 is rotatably supported, halfway between opposite ends of the linking lever 258, by an axis pin 252a on the aperture frame 252. One end of the linking lever 258 is connected with the upper shield plate 254 at an upper shield plate linking pin 254b, and the opposite end of the linking lever 258 is connected with the lower shield plate 256 at a lower shield plate linking pin 256b.

When the upper shield plate 254 moves downward or upward, the linking lever is moved at the linking pin 254b, and pivots about the axis pin 252a. Thus, the lower shield plate 256 is moved by the linking lever 258 at the linking pin 256b, in the opposite direction to the movement of the upper shield plate 256, by an equal amount. As the upper shield plate 254 and lower shield plate 256 move vertically towards and away from each other, the horizontal arms of the shield plates 254, 256 partially cover or fully uncover the photographing aperture 252a to define the panoramic or normal photographic format.

Thus, when the format changing mechanism 200 is actuated to the panoramic mode, the upper shield plate 254 moves downward and the lower shield plate 256 moves upward into the photographing aperture 252A to define the panoramic photographing area. Conversely, when the format changing lever 210 is actuated to the normal mode, the upper shield plate 254 and the down shield plate 256 are removed from the photographing aperture 252A to define the normal photographing area.

Figure 3:
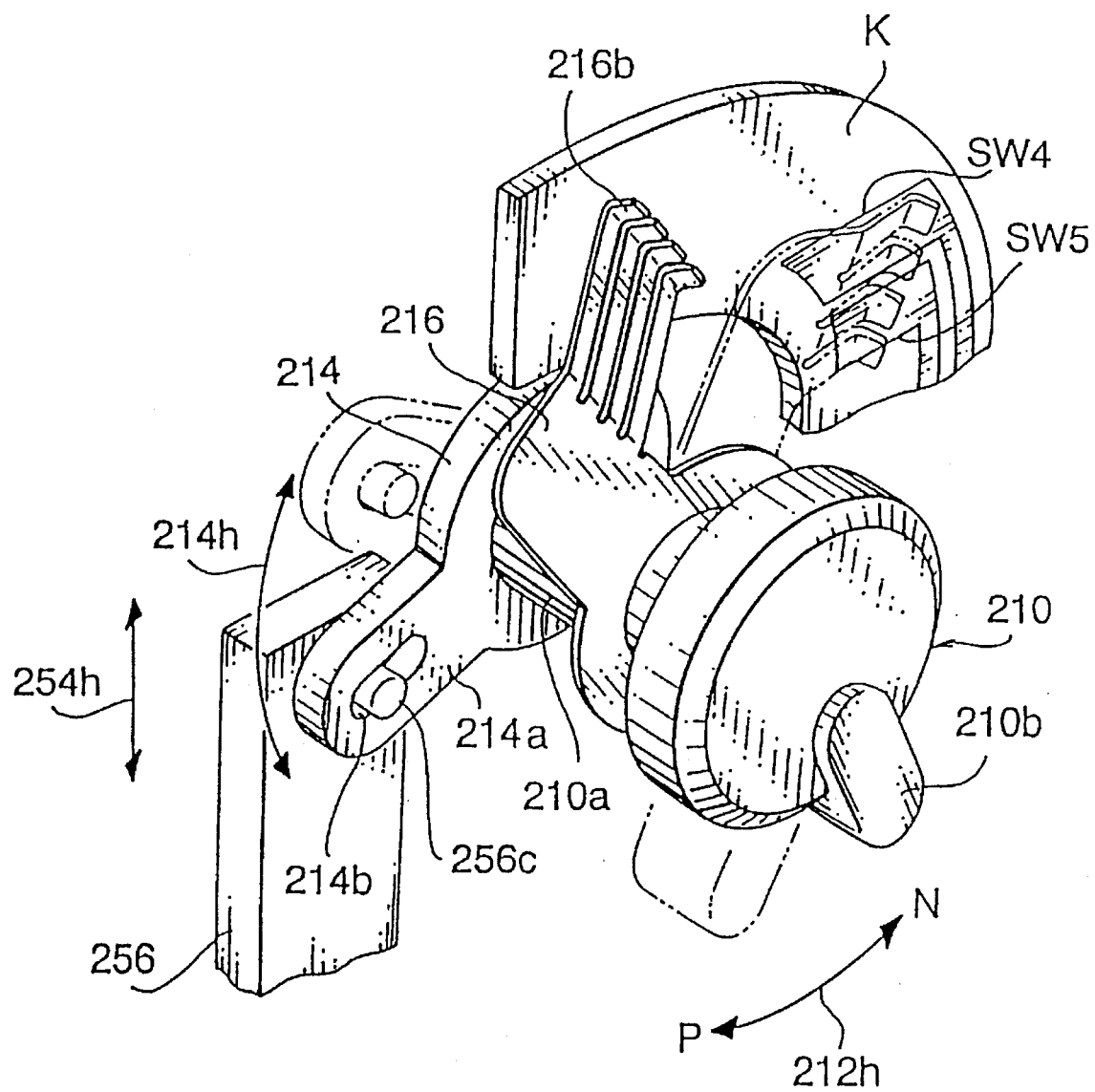
FIG. 3 is a perspective view of a switching mechanism to switch photographic formats according to the embodiments of the present invention.

As seen in FIG. 3, the format changing mechanism 200 further comprises a format mode selector knob 210, pivotably mounted on the back panel of the camera 100, and linked to the lower shield plate 256 at the coupling pin 256c. The lever is mechanically linked to the upper shield plate 254 through the linking lever 258.

The format mode selector knob 210 is further provided with a rotating axis 210a and a lug 210b. A coupling plate 214 and armature plate 216 are attached about the rotating axis 210a.

The coupling plate 214 comprises a driving arm 214a in which coupling slot 214b is formed, and the coupling pin 256c of the lower shield plate 256 is inserted into the coupling slot 214b. Thus, the lower shield plate 256, and thereby the upper shield plate 254, are driven by the rotation of the format mode selector knob 210. The shield plates 254 and 256 are held in the panoramic format position or the normal format position by a click mechanism (not shown).

The armature plate 216 is made of a conductive material, and comprises several armature elements 216b that contact a circuit board K fixed to the camera body. First and second conductive patterns SW4 and SW5 are formed on the circuit board K. The conductive patterns SW4 and SW5 are connected with a CPU, and each of the armature elements 216b are grounded.

The conductive patterns SW4 and SW5 are held in a high impedance state when not contacting any other conductive member. When the format mode selector knob 210 is positioned in the normal format position as shown by solid lines in FIG. 3, the armature elements 216b are not in contact with the conductive patterns SW4 or SW5. When the format mode selector knob 210 is rotated toward the direction "F" shown by the arrow 212h, the armature elements 216b slide on the circuit board K. When the format mode selector knob 210 reaches the panoramic format position shown in FIG. 3 by double-dotted lines, the armature elements 216b contact the conductive patterns SW4 and SW5, which are thereby connected to ground and held grounded.

The CPU can determine that the photographic format is set to panoramic format when at least one of the conductive patterns SW4 and SW5 is grounded. If one of the two conductive patterns SW4 and SW5 experiences contact failure, the CPU will still be able to determine the photographic format based on the state of the other conductive pattern.

When both of the conductive patterns SW4 and SW5 are held in a high impedance state, the CPU determines the photographic format to be in the normal format.

Figure 4:
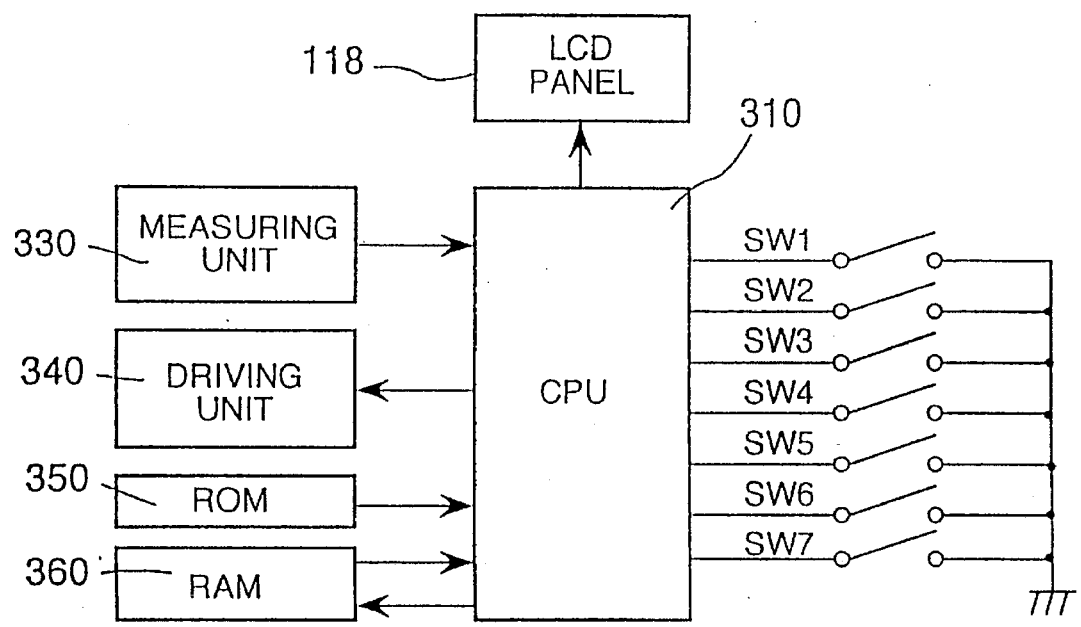
FIG. 4 shows a block diagram of a CPU and controlled elements according to the embodiments of the present invention.

FIG. 4 shows a block diagram of a control means 300 of a camera. The control means 300 comprises the CPU 310, an LCD panel 118 for various status displays, a photometry and autofocus range measuring unit 330, a shutter and lens driving unit 340, a read-only memory (ROM) 350, a random-access memory (RAM) 360, and a block of switches SW1 to SW7. The CPU 310 operates the functional units of the camera according to a program held in the ROM 350 and the RAM 360, which are used for storing data.

The CPU 310 detects the status of the each of switches SW1–SW7 and receives information from the measuring unit 330. The measuring unit 330 measures photometry information and autofocus range information when the photometry switch SW2 turns ON. The CPU 310 operates the LCD panel 118 and the driving unit 340 based on the detected conditions and information. The driving unit 340 drives, for example, a shutter, a lens, and a film winding motor.

Figure 5:
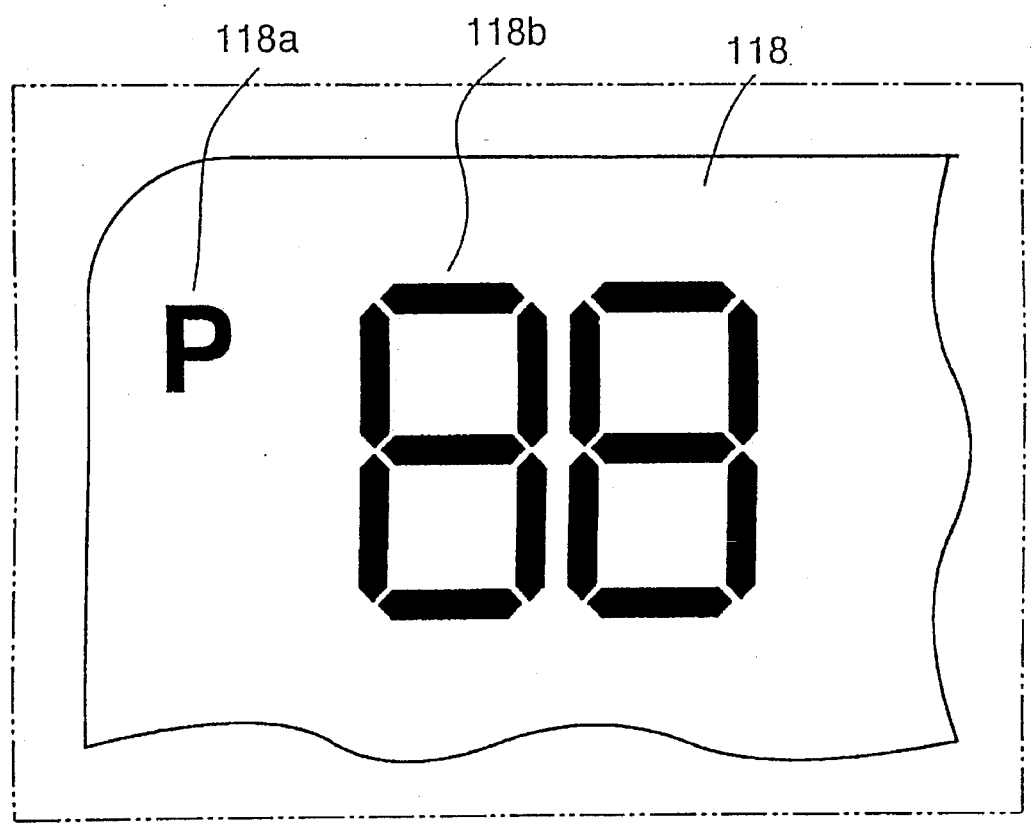
FIG. 5 shows a part of an LCD panel of a first embodiment of a format indicator according to the present invention.

The LCD panel 118 is provided with indicating portions including at least a cumulative panorama frame status indicator 118a and a film count indicator 118b. The cumulative panorama frame status indicator 118a indicates a "P" mark, as shown in FIG. 5, starting from when a first panoramic frame is taken until the film cartridge is removed from the film chamber. If at least one frame of the film cartridge is taken in the panoramic format, the "P" mark is indicated. If all of the frames of the film are taken in the normal format, the "P" mark is not indicated.

Figure 6:
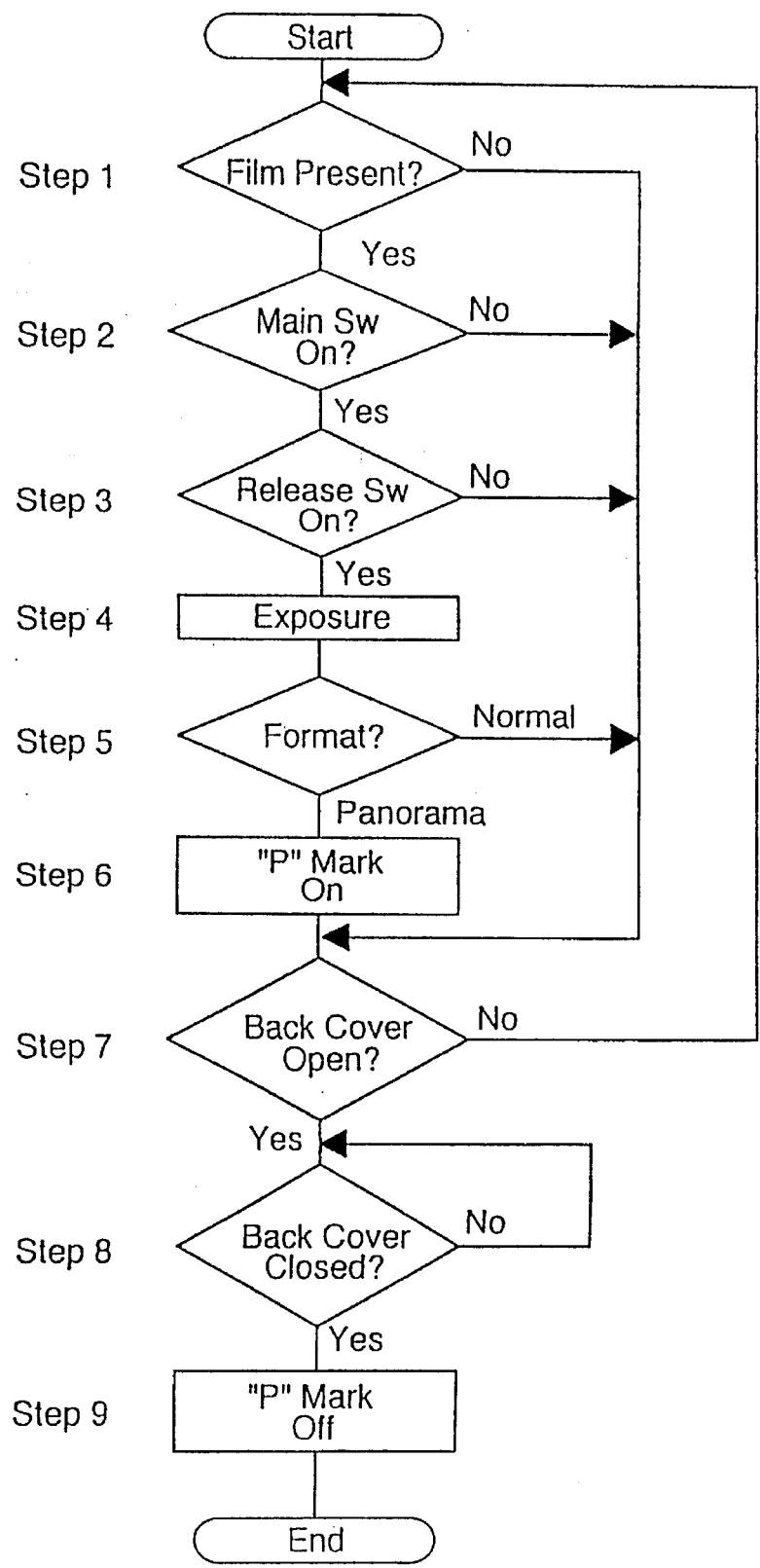
FIG. 6 is a flow chart showing a control sequence of a first embodiment of a format indicator according to the present invention.

The flow chart of FIG. 6 describes the operation of the camera. The user chooses the panoramic or normal format with the format mode selector knob 210 before taking a photograph. In step 1, the camera determines whether a roll of film is loaded in the camera according to the condition of the film detecting switch SW7 (switches SW1 to SW7 are shown in FIG. 4). If the film is loaded, the conditions of the main switch SW1 and the release switch SW3 are detected (steps 2 and 3). If both the main switch SW1 and the release switch SW3 are ON, the CPU 310 drives the driving unit 340 to perform an exposure (step 4).

If film does not exist in the camera (step 1), or the switch SW1 or SW3 is not turned ON (step 2 and 3), the exposure is not performed.

After taking a photograph, the CPU 310 checks the selected format, based on the conditions of the conductive patterns SW4 and SW5 (step 5). If the format is determined to be the panoramic format, the CPU 310 drives the LCD panel 119 to indicate a "P" mark in the cumulative panorama frame status indicator 118a (step 6). When the format is determined to be the normal format, then the step 6 is not performed.

In steps 7 and 8, the CPU 310 determines whether the back cover 116 is open according to the condition of the back cover detecting switch SW6. If the CPU 310 detects the back cover detecting switch SW6 is ON in step 7, the back cover 116 is closed, and the program restarts from the step 1.

If the CPU 310 detects the back cover detecting switch is OFF in the step 7, then the CPU 310 determines the back cover 116 is open, and loops until the back cover 116 is closed in step 8. A film cartridge is considered to be removed when the back cover 116 has been opened and closed once. Therefore, the CPU 310 turns off the "P" mark in the cumulative panorama frame status indicator 118a (step 9).

In step 6, if no frames have been taken in the panoramic format for the current film cartridge, the "P" mark is not indicated. However, if at least one frame has been taken in the panoramic format, the "P" mark is continuously indicated even if the current frame was not taken in the panoramic format. Therefore, when the "P" mark is indicated, a user can know that at least one frame of the current film cartridge has been taken in the panoramic format.

The LCD panel of FIG. 5 is alternatively controlled by the flow chart of FIG. 8 (described below), with the "P" indication being turned on at step 26.

Figure 7:
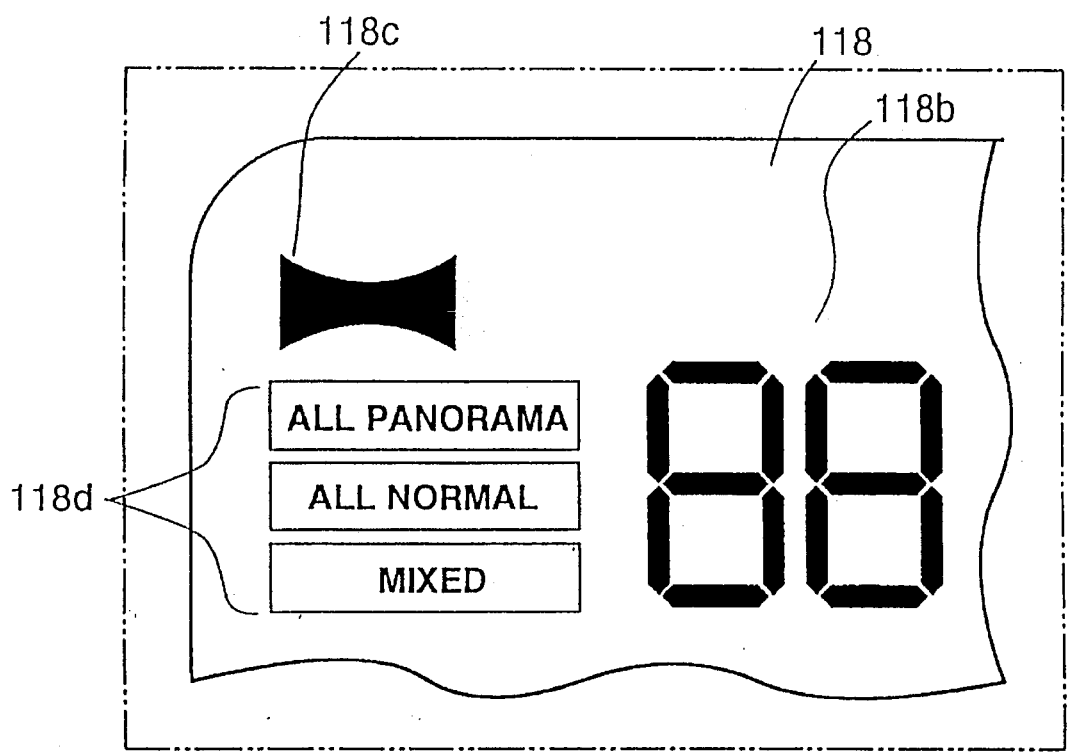
FIG. 7 shows a part of an LCD panel of a second embodiment of a format indicator according to the present invention.
Figure 8:
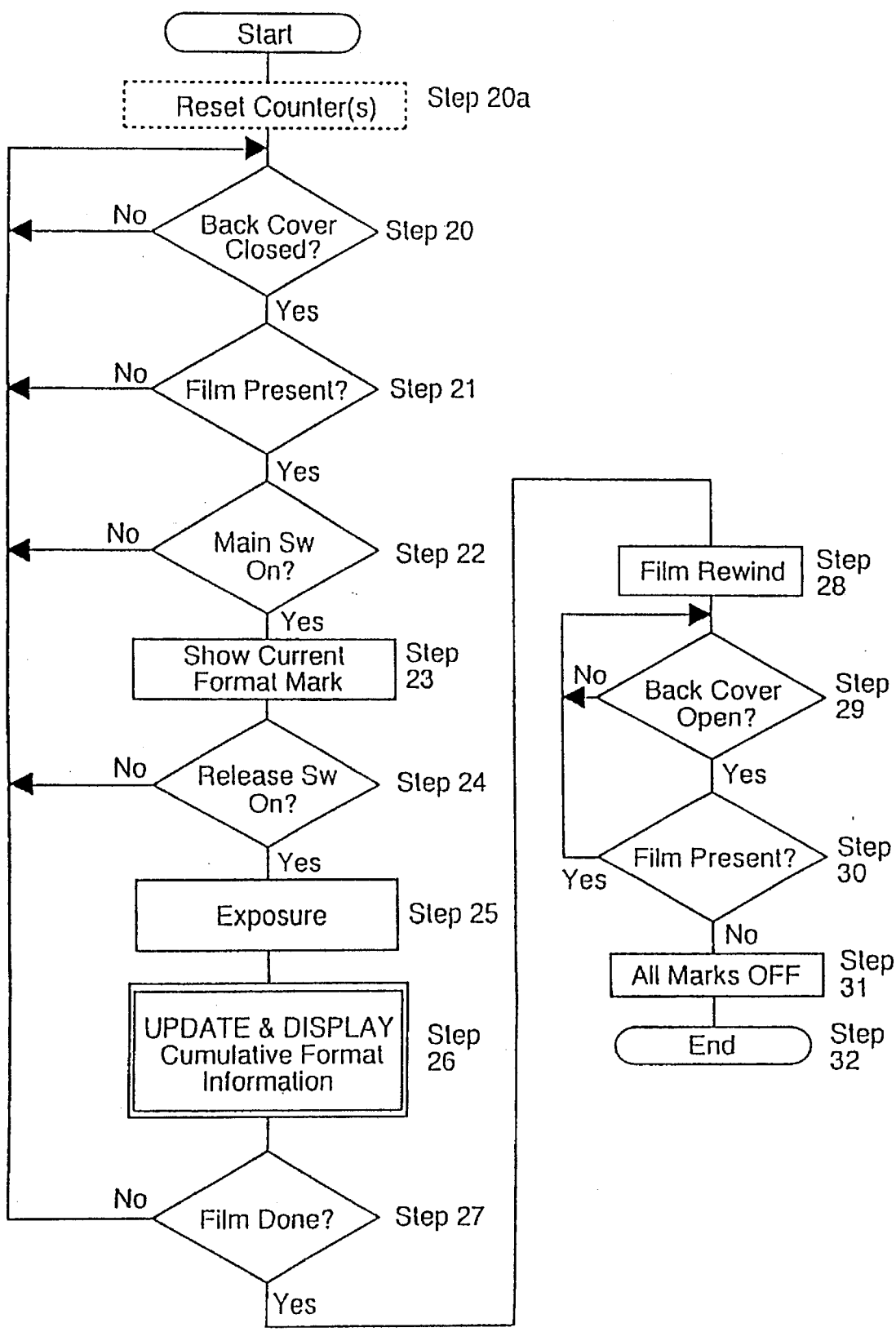
FIG. 8 is flow chart showing a general control sequence applicable to a second embodiment and to a modified second embodiment of a format indicator according to the present invention.

FIGS. 7 and 8 show a second embodiment of an indicator panel according to the present invention. As shown in FIG. 7, the LCD panel 118 according to the second embodiment has a film count indicator 118b, a panoramic mark indicator 118c and a cumulative frame format status indicator 118d. The cumulative frame format status indicator 118d comprises at least three portions, in this case "ALL PANORAMA", "ALL NORMAL" and "MIXED". The cumulative frame format status indicator 118d is controlled such that the appropriate one of the three portions is selectably indicated following exposure of current film cartridge.

The operation of indicator panel of the second embodiment appears in the flow chart shown in FIG. 8. Specific implementations of the display update routine appear in FIG. 9.

Figure 9:
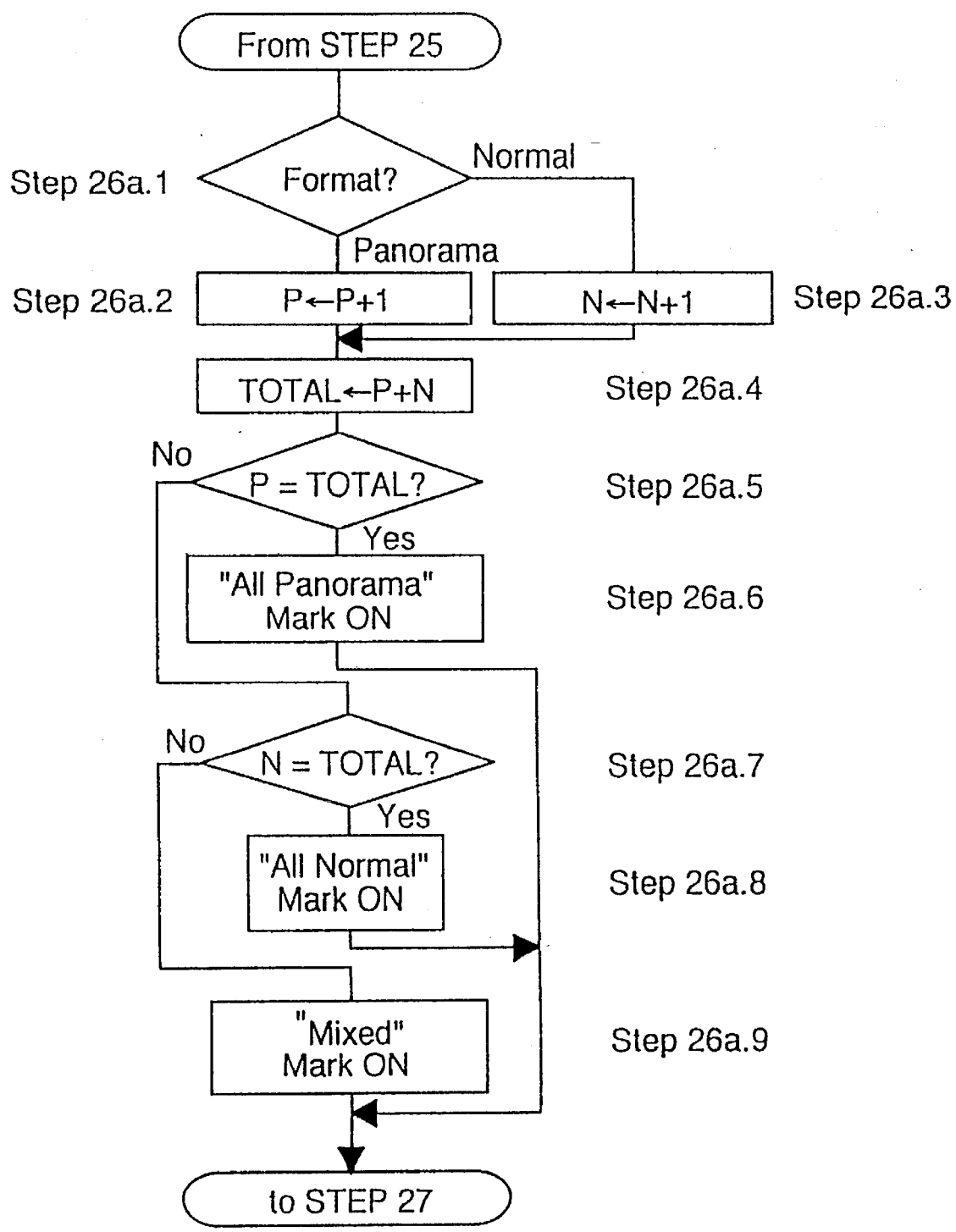
FIG. 9 is a flow chart showing an example of a detailed control sequence of a second embodiment of a format indicator according to the present invention.

Initially, the total frame counter TOTAL is reset to 0 in step 20a, and if the cumulative frame display update routine of step 26 requires counters other than the total frame counter TOTAL, such as the specific routine of FIG. 9, these counters are reset to zero. However, the update of the routine may be accomplished by checking flags that indicate display status, or by using only one additional counter for either of the panoramic or normal frames taken, and subtracting from the total count to arrive at the other of the panoramic or normal frames taken.

In steps 20 through 22, the CPU 310 detects the status of the back cover 116, the film detecting switch SW7, and the main switch SW1. If the back cover 116 is open, film is not present, or the main switch SW1 is OFF, the program is restarted from the step 20.

When the results of steps 20 through 22 are all "YES", the CPU 310 determines the selected photographic format according to the status of the conductive patterns SW4 and SW5, and displays the appropriate mark for the current format (step 23). If the format is set to the panoramic format, the panorama mark is indicated by the panorama mark indicator 118c. If the format is set to the normal format, the panorama mark indicator 118c is turned off.

In step 24, the CPU 310 checks whether the release switch SW3 is ON or OFF. If the release switch SW3 is OFF, the program is restarted from the step 20. If release switch is ON, the CPU 310 performs an exposure (step 25), and then enters a cumulative frame format update and display routine (step 26), and indicates "MIXED", "ALL PANORAMA", or "ALL NORMAL" according to the updated status of flags, counters, etc., denoting the cumulative frame format status. As described, the cumulative frame format status update of the routine may accomplished by checking the flags that indicate display status, by checking the displays themselves for display status, by using only one counter for total frames and one for either of panoramic or normal frames taken, or by using counters for each of the mixed, panoramic, and normal cumulative frame format displays, the latter method shown in FIG. 9.

If the routine of FIG. 9 is used, when the process flow has reached step 26, the CPU 310 has reset counters P, N and TOTAL to zero in step 20a, shown in a dotted line box in FIG. 8. The counters P, N and TOTAL count exposure frames of each format and total frames. In steps 26a.1, 26a.2 and 26a.3, the CPU 310 increments the counters P and TOTAL by 1 when the format is set to the panoramic format, or increments the counters N and TOTAL by 1 when the format is set to the normal format.

If the routine of FIG. 9 is used, the CPU 310 then selects the appropriate indicating portion of the cumulative frame format status indicator 118d (steps 26a.5 through 26a.9). If the counter P is equal to TOTAL, "ALL PANORAMA" is indicated. If the counter N is equal to TOTAL, "ALL NORMAL" is indicated. When the counter TOTAL is not equal to P or to N, "MIXED" is indicated.

The steps 20 through 26 (including steps 26a.1 through 26a.9 if three counters are used to determine the cumulative frame format status) are performed until the CPU 310 determines that the entire film is exposed in step 27. When the entire film is exposed or a user intends to take out the exposed film cartridge, the CPU 310 controls the driving unit 340 to rewind the film (step 28).

The cumulative frame format status indicator 118d is left ON, showing the appropriate format information, until both the back cover 116 has been opened and the film cartridge is removed (steps 40 and 41), when all the indication marks of the LCD panel 118 are turned off (step 42).

Alternatively, steps 26a.5 through 25a.9 can be performed instead between steps 28 and 29, so that the cumulative frame format is indicated only after the film is rewound and stays on until the film is removed.

In the second embodiment of the indicator panel, the CPU 310 not only detects whether the current film cartridge includes frames taken by the panoramic format, but also detects whether the frames are panoramic format, all normal, or mixed.

Figure 10:
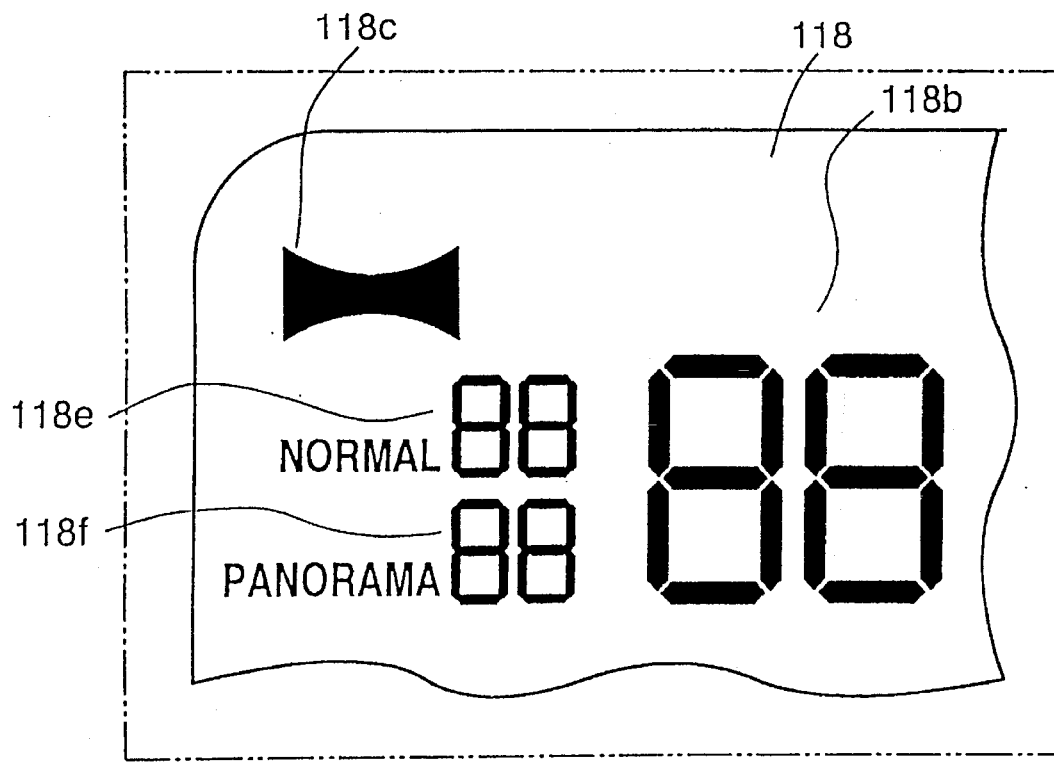
FIG. 10 shows a part of an LCD panel of a modified second embodiment of a format indicator according to the present invention.
Figure 11:
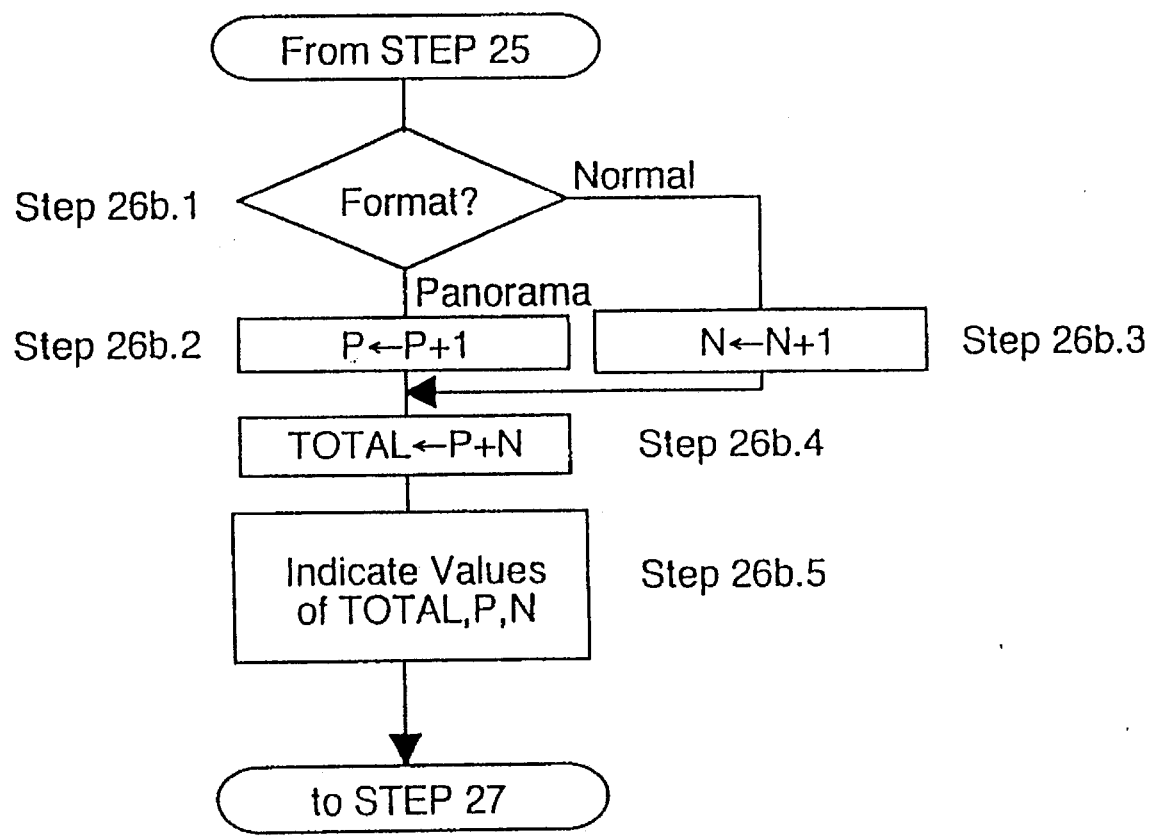
FIG. 11 is a flow chart showing an example of a detailed control sequence of a modified second embodiment of a format indicator according to the present invention.

FIG. 10 shows an LCD panel 118 of a modification of the second embodiment of an indicator panel according to the present invention. The LCD panel 118 has a total frame count indicator 118b, a normal frame count indicator 118e and a panorama frame count indicator 118f. In this modification of the second embodiment, following the process flow shown in FIGS. 8 and 11, the CPU 310 preferably uses the counters P, N and TOTAL for counting exposed frames for each format, and the LCD panel 118 is controlled using the values of the counters P, N and TOTAL. The total frame count indicator 118b displays the value of the counter TOTAL, and the indicators 118e and 118f display the values of the counters N and P respectively. Alternatively, and not shown in FIG. 11, the number of cumulative frames of each type may be recorded with just two counters, TOTAL and P (or N), the other of P or N determined by subtracting from TOTAL.

The flow chart of FIG. 8, describing the second embodiment, also describes the general control sequence of the modification of the second embodiment. Steps 20 through 42 are the same as the unmodified second embodiment shown in FIG. 8. In this modified second embodiment, all counters 118b, 118e, and 118f are reset to zero in step 20a. When step 26 is executed, the total frame count indicator 118b, the normal frame count indicator 118e and the panorama frame count indicator 118f are updated and displayed. As shown in detail in FIG. 11, one method of updating the indicators 118b, 118e, and 118f selects the appropriate counter of P, N, or TOTAL, and increments the appropriate counter (steps 26b.1 through 26b.5). According to the flow chart of FIG. 11, the CPU 310 controls the LCD panel 118 to indicate each of the format frame counts based on the values of the counters P, N and TOTAL in step 26b.5.

Figure 12:
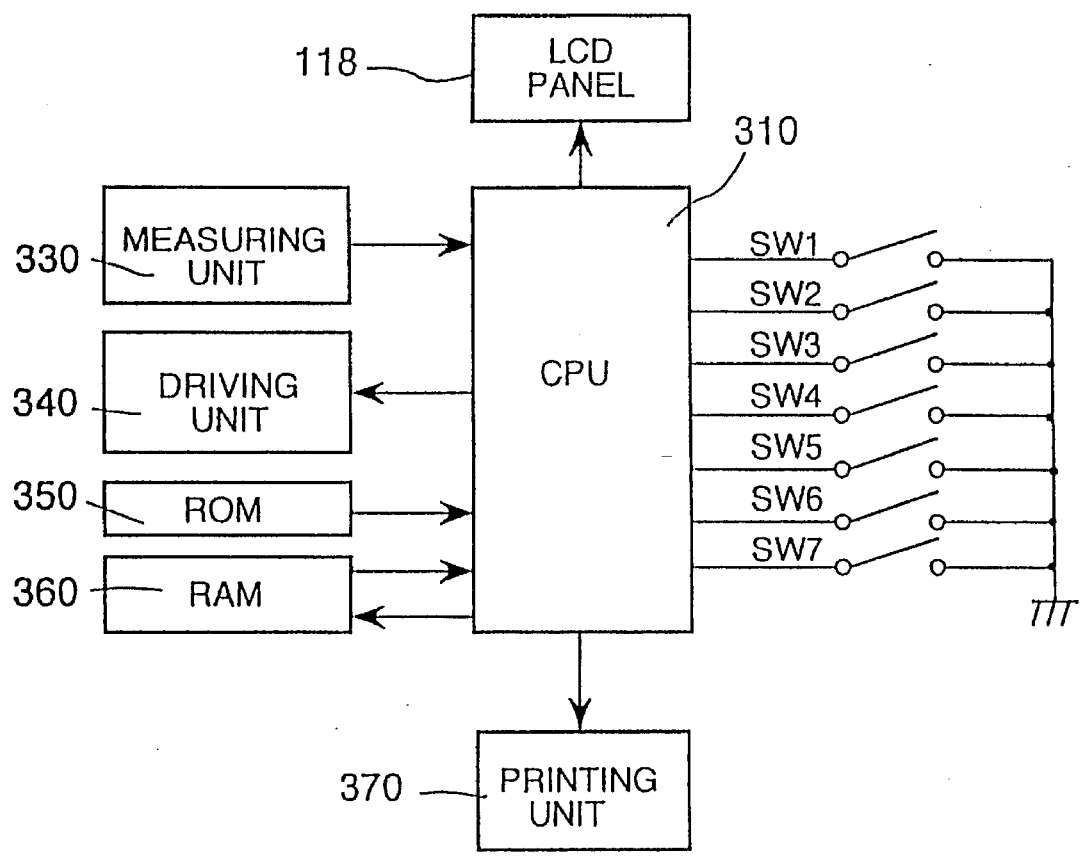
FIG. 12 shows a block diagram of a CPU and controlled elements of a third embodiment of a format indicator according to the present invention.

FIG. 12 shows a third embodiment of a format information indicator according to the present invention. In the third embodiment, the control device 300 of the camera 100 controls a printing unit 370 for printing a marking which indicates information concerning the photographic format to a film cartridge F. The printing unit 370 is, for example, arranged in the film chamber 119 as shown in FIG. 1. The position of the printing head 370 as shown in FIG. 1 is not critical; the printing head 370 may be anywhere in the film chamber 119 proximate to the cartridge F.

The sequence of the operation of the third embodiment is similar to that of the first embodiment. However, instead of activating the cumulative panorama frame status indicator 118a on the LCD panel 118, or in addition to the indication on the LCD panel 118, the printing unit 370 is driven by the CPU 310 so that the printing unit 370 prints the photographic format information just before an exposed film cartridge F is removed from the film chamber 119.

Figure 13A:
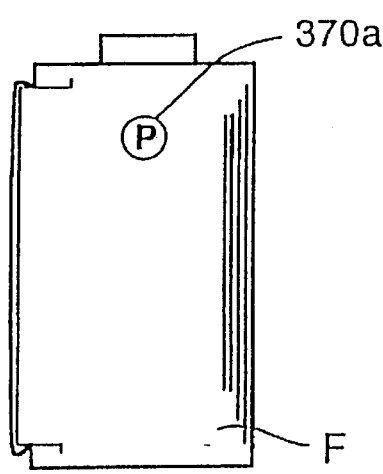
FIG. 13(a) shows a film cartridge printed by a printing device of a third embodiment of a format indicator according to the present invention.
Figure 13B:
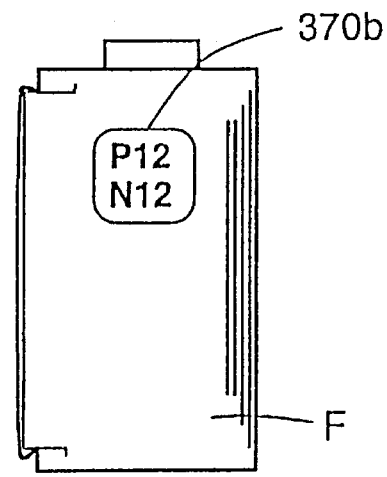
FIG. 13(b) shows a film cartridge printed by a modified printing device of a third embodiment of a format indicator according to the present invention.

The printed information is, for example, shown in FIGS. 13(a) and 13(b). In FIG. 13(a), the mark "P" 370a means at least one frame of the film cartridge F was taken by the panoramic format. Moreover, the flow charts of FIGS. 8, 9 and 11 can also be applied to the third embodiment, except that a printing operation is performed where portions of the LCD panel 118 are activated in the previous embodiments. In the case of FIGS. 8 and 9, the printed information is "ALL PANORAMA", "ALL NORMAL" or "MIXED". In the case of FIGS. 8 and 10, the printed information is numerical information according to the values of the counters P, N and TOTAL as shown in FIG. 13(b).

The printing unit 370 uses a conventional printing mechanism for printing the information to the cartridge. For example, a conventional stamp-type inked printhead is used.

In this case, the printing unit 370 uses a sponge or other inking reservoir (not shown) to be periodically replaced, for instance, at the same time that a battery is replaced. The printing unit 370 may be spring-loaded to contact the cartridge F when the cartridge F is inserted, and prints only when driven by the control device 300. Alternatively, the film cartridge F may be provided with a thermosensitive print area, or a thermosensitive sticker may be affixed to the cartridge F, and a conventional thermal-type print head may be used. When the printing unit 370 is used to print numerical information such as in FIG. 13(b), a stamp or hammer array may have multiple segments or movable segments, or a multi-segment (seven-segment numerical) thermal head may be used. Other printing methods such as ink jet technology, may also be used.

According to the third embodiment, information regarding the various formats of exposed frames of the film cartridge F is available even after the film cartridge is removed from the film chamber 119.

The present disclosure relates to subject matter contained in Japanese patent application No. HEI 5-268340, filed on Sep. 30, 1993, which is expressly incorporated herein by reference in its entirety.

What is claimed is:

1. A photographic format information indication system for a camera, the camera having a plurality of selectable photographic formats, said system comprising:

detection means for detecting a selected photographic format of each of a plurality of frames of a film when the camera has performed an exposure on said frame;

means for indicating information regarding a selected photographic format, said indicating means comprising an electronic display means provided to the camera;

means for detecting removal of said film from the camera; and means for controlling said indicating means to indicate information representative of at least one instance of said detection of at least one predetermined photographic format and for controlling said indication means so that said indicated information remains indicated until said removal detecting means detects removal of the film from the camera;

wherein said controlling means is provided with a counting means for counting a number of said frames exposed in each of said photographic formats, said controlling means updating said counting means after each of said frames is exposed by said camera.

2. The system according to claim 1, said controlling means comprising means for controlling said indicating means to update said indicated information according to said counting by said counting means after each of said frames of said film is exposed, and said indicated information comprising a number of said frames exposed in at least one of said photographic formats.

3. The system according to claim 1, wherein said camera has at least first and second photographic formats, and wherein said indicating means has portions for selectively indicating character information showing that said film contains only frames exposed in said first photographic format, that said film contains only frames exposed in said second photographic format, and that said film contains frames exposed in both of said first and second photographic formats.

4. The system according to claim 3, wherein said controlling means selects said character information according to said counting means, and wherein said controlling means controls said indicating means to indicate said character information.

5. The system according to claim 3, wherein said first photographic format is a panoramic format and said second photographic format is a normal format.

6. The system according to claim 1, wherein said camera has at least first and second photographic formats, and said indicating means is provided with portions for indicating a number of said exposed frames of said film in each of said photographic formats, said number counted by said counting means.

7. A photographic format information indication system for a camera, the camera having a plurality of selectable photographic formats, said system comprising:

detection means for detecting a selected one of said plurality of selectable photographic formats of each of a plurality of frames of a film when the camera has performed an exposure on said each of said plurality of frames;

means for indicating information regarding a selected photographic format; and means for controlling said indicating means to indicate information representative of at least one instance of said detection of at least one of said plurality of selectable photographic formats;

said controlling means comprising counting means for counting a number of frames of said film exposed in each of said plurality of selectable photographic formats and updating means for updating said counting means after each of said plurality of frames of said film are exposed.

8. The system according to claim 7, wherein said indicating means comprises a printing means;

wherein said controlling means controls said printing means to print said photographic format information on a film cartridge loaded in said camera after all of said plurality of said frames of the film are exposed, said character information representing a number of exposed frames in each of said photographic formats.

9. The system according to claim 8, said plurality of selectable photographic formats comprising a panoramic format and a normal format.

10. A photographic format information indication system for a camera, the camera having a plurality of selectable photographic formats, said system comprising:

detection means for detecting a selected photographic format of each frame of a film when the camera has performed an exposure on said frame;

printing means for printing information on a film cartridge loaded in the camera;

means for controlling said printing means to print information representative of at least one instance of a detection of at least one predetermined photographic format by said detecting means;

said controlling means comprising counting means for counting a number of said frames of said film exposed in each of said photographic formats and updating means for updating said counting means after each of said frames of the film are exposed; and said controlling means further controlling said printing means to print character information, representing a number of exposed frames in each of said photographic formats, after all of said frames of the film are exposed.

11. The system according to claim 10, wherein said plurality of selectable photographic formats include first and second photographic formats, and wherein said first photographic format is a panoramic format and said second photographic format is a normal format.

12. The system according to claim 10, further comprising indicator means responsive to said detection means for indicating a selected photographic format of each frame of a film when the camera has performed an exposure on said frame, said indicator means being positioned on an external surface of the camera.

13. A process for indicating photographic format information in a camera, the camera including a plurality of selectable photographic formats and an electronic display, the process comprising the steps of:

detecting whether the camera contains photographic film;

detecting whether a main switch is turned ON;

detecting whether a release switch is turned ON;

detecting whether a predetermined one of the plurality of selectable photographic formats is selected;

indicating information on the electronic display related to one of the selectable photographic formats when film is detected in the camera, the main and release switches are detected to be ON, and the predetermined one of the plurality of selectable photographic formats is detected; and counting a number of frames exposed in each of the plurality of selectable photographic formats; and updating the number after each frame is exposed.

14. The process according to claim 13, wherein said indicating is based on said counting and is performed after said updating, and wherein said indicated information represents a number of said frames exposed in at least one of said photographic formats.

15. The process according to claim 13, wherein the plurality of selectable photographic formats include at least first and second photographic formats, and the information indicated comprises character information that the film contains only frames exposed in the first photographic format, that the film contains only frames exposed in the second photographic format, or that the film contains frames exposed in both the first and second photographic formats.

16. The process according to claim 13, wherein said information comprises character information representative of said counting.

17. The process according to claim 13, wherein said plurality of selectable photographic formats comprises a panoramic format and a normal format.

18. The process according to claim 13, the indicated information comprises a number of exposed frames of the film in each of the selectable photographic formats, the number based on the counting.

* * * * *